(12) United States Patent
Hayashida et al.

(10) Patent No.: US 7,529,567 B2
(45) Date of Patent: May 5, 2009

(54) RADIO TELEPHONE APPARATUS AND METHOD FOR CONTROLLING AMOUNT OF ELECTRIC CURRENT CONSUMPTION THEREOF

(75) Inventors: Koji Hayashida, Ogouri (JP); Hiroshi Kataoka, Kasuga (JP); Katsuyuki Otsubo, Kasuga (JP)

(73) Assignee: Panasonic Corporation, Osaka (JP)

( * ) Notice: Subject to any disclaimer, the term of this patent is extended or adjusted under 35 U.S.C. 154(b) by 414 days.

(21) Appl. No.: 11/193,624

(22) Filed: Aug. 1, 2005

(65) Prior Publication Data
US 2006/0025170 A1    Feb. 2, 2006

(30) Foreign Application Priority Data
Aug. 2, 2004    (JP)    ............ P. 2004-225366

(51) Int. Cl.
*H04M 1/00* (2006.01)
(52) U.S. Cl. ............... 455/574; 455/127.5
(58) Field of Classification Search ......... 455/343.1, 455/343.2, 343.5, 550.1, 572–574, 127.1, 455/127.2, 127.5, 552.1, 553.1
See application file for complete search history.

(56) References Cited

U.S. PATENT DOCUMENTS

| | | | |
|---|---|---|---|
| 4,524,461 A * | 6/1985 | Kostanty et al. ............ 455/79 |
| 5,247,704 A | 9/1993 | Greenwood | |
| 5,497,507 A * | 3/1996 | Komaki ............... 455/552.1 |
| 5,960,346 A | 9/1999 | Holshouser | |
| 6,229,995 B1 * | 5/2001 | Lee ................ 455/127.2 |
| 6,356,768 B1 * | 3/2002 | Saito et al. ............ 455/572 |
| 6,459,885 B1 * | 10/2002 | Burgess ............... 455/83 |
| 6,678,538 B1 * | 1/2004 | Koizumi ............... 455/574 |
| 6,944,483 B1 * | 9/2005 | Motohashi ............ 455/574 |
| 6,961,594 B2 * | 11/2005 | Rankin ............... 455/574 |
| 7,031,682 B2 * | 4/2006 | Hayashihara ........... 455/194.2 |
| 7,209,720 B2 * | 4/2007 | Balasubramaniyan et al. ............... 455/127.5 |
| 7,248,846 B2 * | 7/2007 | Kayano et al. ........... 455/127.3 |
| 7,289,778 B2 * | 10/2007 | Sasaki ............... 455/127.5 |
| 7,400,864 B2 * | 7/2008 | Kazakevich et al. ...... 455/114.2 |
| 2002/0028700 A1 * | 3/2002 | Kato ................ 455/572 |

* cited by examiner

*Primary Examiner*—Nhan T Le
(74) *Attorney, Agent, or Firm*—Dickinson Wright PLLC

(57) ABSTRACT

A radio telephone apparatus includes a transmission section that transmits a radio wave, a consumption section that consumes an amount of an electric current equal to that consumed by the transmission section, and a control section that controls activations of the transmission section and the consumption section. The control section activates the consumption section to consume the amount of the electric current during the period when the transmission section is not activated.

9 Claims, 11 Drawing Sheets

RADIO TELEPHONE APPARATUS AND METHOD FOR CONTROLLING AMOUNT OF ELECTRIC CURRENT CONSUMPTION THEREOF

BACKGROUND OF THE INVENTION

The present invention relates to a radio telephone apparatus which performs voice or data communication through radio transmission and receipt operations and includes a voice coil used for effecting magnetic coupling with a pickup coil provided in a hearing aid used by a hearing-impaired person, as well as to a method for controlling electric current consumption of the radio telephone apparatus.

Some wired telephones have a voice coil for the benefit of a hearing-impaired person, and such a voice coil is also applied to a radio telephone apparatus. A telephone feeds, to the voice coil, an electric current corresponding to a voice, so that a magnetic field is generated. In the meantime, some hearing aids used by the hearing-impaired persons have pickup coils. The pickup coil magnetically couples with the voice coil provided in the telephone, thereby a voice output from the telephone is transmitted to the hearing aid. As a result, the voice output from the telephone can be transmitted without being affected by ambient noise, in contrast with the hearing aid that picks up a voice by a microphone.

In relation to the radio telephone apparatus, in the case of a portable cellular phone used on a wide frequency band, voice or data are transmitted by exchanging a radio wave with a cell site. In the case of a cordless telephone used in a house, voice or data are transmitted by exchanging a radio wave between a base unit and a handset.

A portable cellular phone which is an example of the radio telephone apparatus includes a transmission section and a receiving section for effecting radio communication. The transmission section is a circuit for transmitting a radio wave to the cell site. When a radio wave is transmitted, a large quantity of current flows from a battery, which serves as a power source, into the circuit. The receiving section is a circuit for receiving a radio wave from the cell site. When a radio wave is received, an electric current flows into the circuit. By timewise changes in the flowing electric current, a magnetic field originates from surroundings of the circuit of the transmission section or the circuit of the receiving section.

On the assumption that the portable cellular phone performs transmission and receipt by a time-division slot scheme formed from a transmission slot, which is to be a duration in which a radio wave is transmitted to a cell site, and a receiving slot, which is to be a duration in which the cell site transmits a radio wave, changes in the magnetic field appear every period of the time-division slot.

Accordingly, the magnetic field, which is noise developing every period of a time-division slot, is magnetically coupled with the pickup coil provided in the hearing aid, and the noise is superimposed on the voice as a hum that develops every period of the time-division slot. This hum makes it very difficult for the heating-impaired person to hear a voice. Especially, an amplifier for amplifying the signal, which will become the source of a radio wave, consumes a large amount of electric current, and hence time-wise changes in the electric current for a transmission slot are great, so that the level of development of a magnetic field also becomes greater correspondingly.

A radio telephone apparatus which dampens the influence of such a timewise-varying magnetic field is described in U.S. Pat. No. 5,960,346. The radio telephone apparatus described in U.S. Pat. No. 5,960,346 has a smoothing capacitor connected in parallel with a transmission section. Sharp variations in electric current can be dampened by feeding an electric current from the smoothing capacitor to the transmission section, thereby reducing the level to which the magnetic field develops.

The smoothing capacitor used in the radio telephone apparatus described in U.S. Pat. No. 5,960,346 must have a time constant which is longer than that of a time-division slot. Hence, a capacitor of comparatively-large capacitance is used. Miniaturization and weight reduction of the radio telephone apparatus are desired so that the radio telephone apparatus can be easily carried. Difficulty is encountered in ensuring a space used for mounting circuit components. For these reasons, mounting of a smoothing capacitor of large capacitance is difficult.

SUMMARY OF THE INVENTION

It is therefore an object of the present invention to provide a radio telephone apparatus which is easy for a hearing-impaired person to hear a voice while miniaturization and weight reduction are established.

In order to achieve the above object, according to the present invention, there is provided a radio telephone apparatus, comprising:

a transmission section that transmits a radio wave;

a consumption section that consumes an amount of an electric current equal to that consumed by the transmission section; and a control section that controls activations of the transmission section and the consumption section, wherein the control section activates the consumption section to consume the electric current during the period when the transmission section is not activated.

Preferably, the control section generates a transmission section enable signal for controlling an activation and a halt of the transmission section and a consumption section enable signal for controlling an activation and a halt of the consumption section.

Preferably, the control section delays a timing of transmitting the consumption section enable signal for halting the consumption section with respect to a timing of transmitting the transmission section enable signal for activating the transmission section when the control section activates the transition section so that a change of a sum of amounts of electric currents consumed by the transmission section and the consumption section is reduced during a transition from a halting state of the transition section to an activating state of the transition section.

Preferably, the control section delays a timing of transmitting the consumption section enable signal for activating the consumption section with respect to a timing of transmitting the transmission section enable signal for halting the transmission section when the control section halts the transition section so that a change of a sum of amounts of electric currents consumed by the transmission section and the consumption section is reduced during a transition from an activate state of the transition section to a halting state of the transition section.

Preferably, the consumption section includes, a receiving section for receiving a radio wave; and a first load circuit for consuming an amount of a difference electric current between the amount of the electric current consumed by the transmission section and the amount of the electric current consumed by the receiving section. The control section activates the receiving section and the first load circuit during the period when the transmission section is not activated.

Preferably, the first load circuit includes a resistor for consuming an electric current, and a switching element for feeding the electric current to the resistor.

Preferably, the control section generates a transmission section enable signal for controlling an activation and a halt of the transmission section, and a consumption section enable signal for controlling an activation and a halt of the consumption section. The consumption section enable signal includes a receiving section enable signal for controlling an activation and a halt of the receiving section and a first load enable signal for controlling an activation and a halt of the first load circuit.

Preferably, the consumption section includes a receiving section for receiving a radio wave, a second load circuit for consuming an amount of an electric current equal to that consumed by the transmission section, and a third load circuit for consuming an amount of a difference electric current between the amount of the electric current consumed by the transmission section and the amount of the electric current consumed by the receiving section. The control section activates the second load circuit or both of the receiving section and the third load circuit to consume the amount of the electric current during the period when the transmission section is not activated.

Preferably, the consumption section and the transmission section are mounted on a substrate. The consumption section is arranged in proximity to the transmission section on the substrate.

According to the present invention, there is also provided a method for controlling an amount of electric current consumed by a radio telephone apparatus that includes a transmission section and a consumption section, the method comprising:

activating the transmission section for transmitting a radio wave; and activating the consumption section to consume an amount of the electric current during the period when the transmission section is not activated, wherein the amount of the electric current consumed in the consumption section is equal to an amount of the electric current consumed in the transmission section.

Preferably, the method further comprises:

generating a transmission section enable signal for controlling an activation and a halt of the transmission section; and generating a consumption section enable signal for controlling an activation and a halt of the consumption section.

Preferably, the method further comprises:

delaying a timing of transmitting the consumption section enable signal for halting the consumption section with respect to a timing of transmitting the transmission section enable signal for activating the transmission section when the control section activates the transition section so that a change of a sum of amounts of electric currents consumed by the transmission section and the consumption section is reduced during a transition from a halting state of the transition section to an activating state of the transition section.

Preferably, the method further comprises delaying a timing of transmitting the consumption section enable signal for activating the consumption section with respect to a timing of transmitting the transmission section enable signal for halting the transmission section when the control section halts the transition section so that a change of a sum of amounts of electric currents consumed by the transmission section and the consumption section is reduced during a transition from an activate state of the transition section to a halting state of the transition section.

According to the present invention, the control section generates, as being enabled, a signal for activating consumption section such that an amount of an electric current equal to that consumed by the transmission section is consumed during a period when the transmission section enable signal becomes disabled, thereby reducing timewise changes in the consumed current. Consequently, the radio telephone apparatus allows the hearing-impaired person to easily hear a voice, without mounting a large component like a smoothing capacitor.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE PREFERRED EMBODIMENTS

First Embodiment

Figure 1:
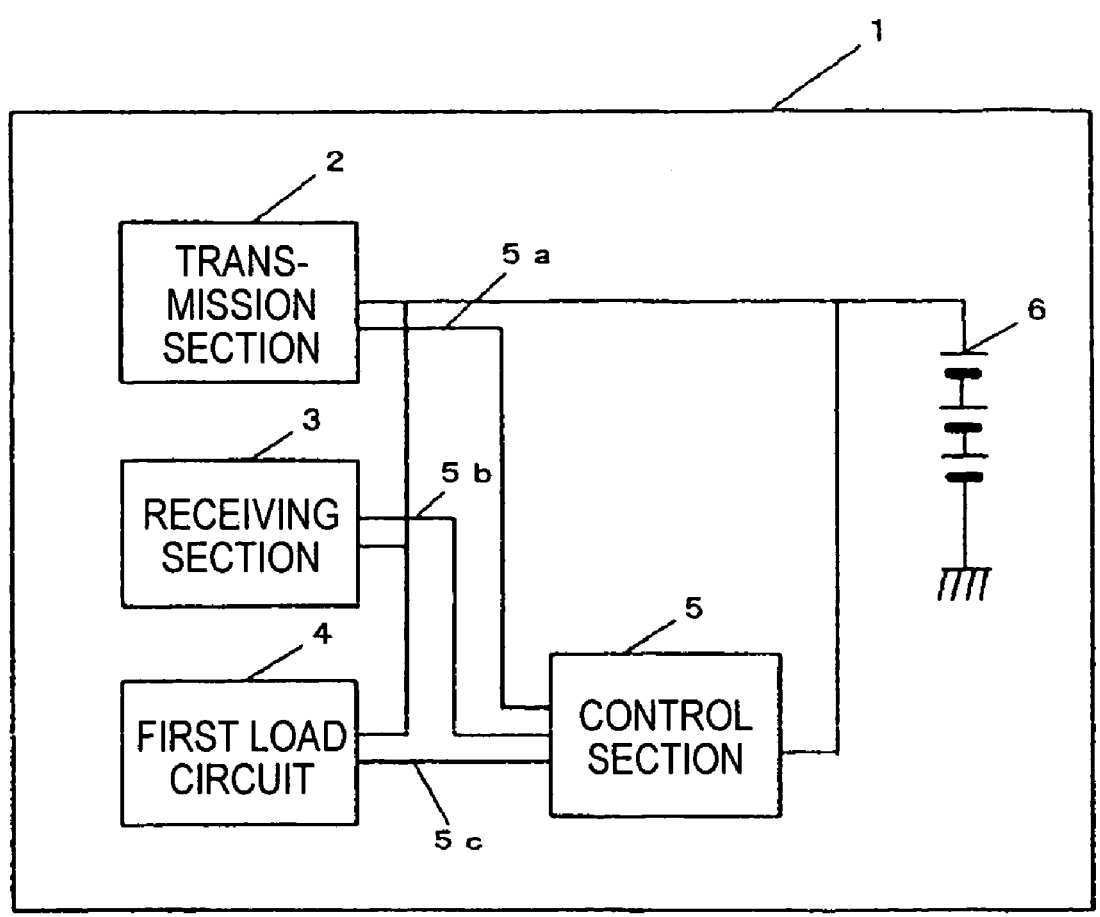
FIG. 1 is a view of a portable cellular phone which is an example of the radio telephone apparatus according to a first embodiment of the present invention.

The configuration of a portable cellular phone which is a radio telephone apparatus according to a first embodiment of the present invention will be described by reference to FIGS. 1 through 3. FIG. 1 is a view for describing a portable cellular phone which is an example of the radio telephone apparatus according to the first embodiment of the present invention.

Figure 2:
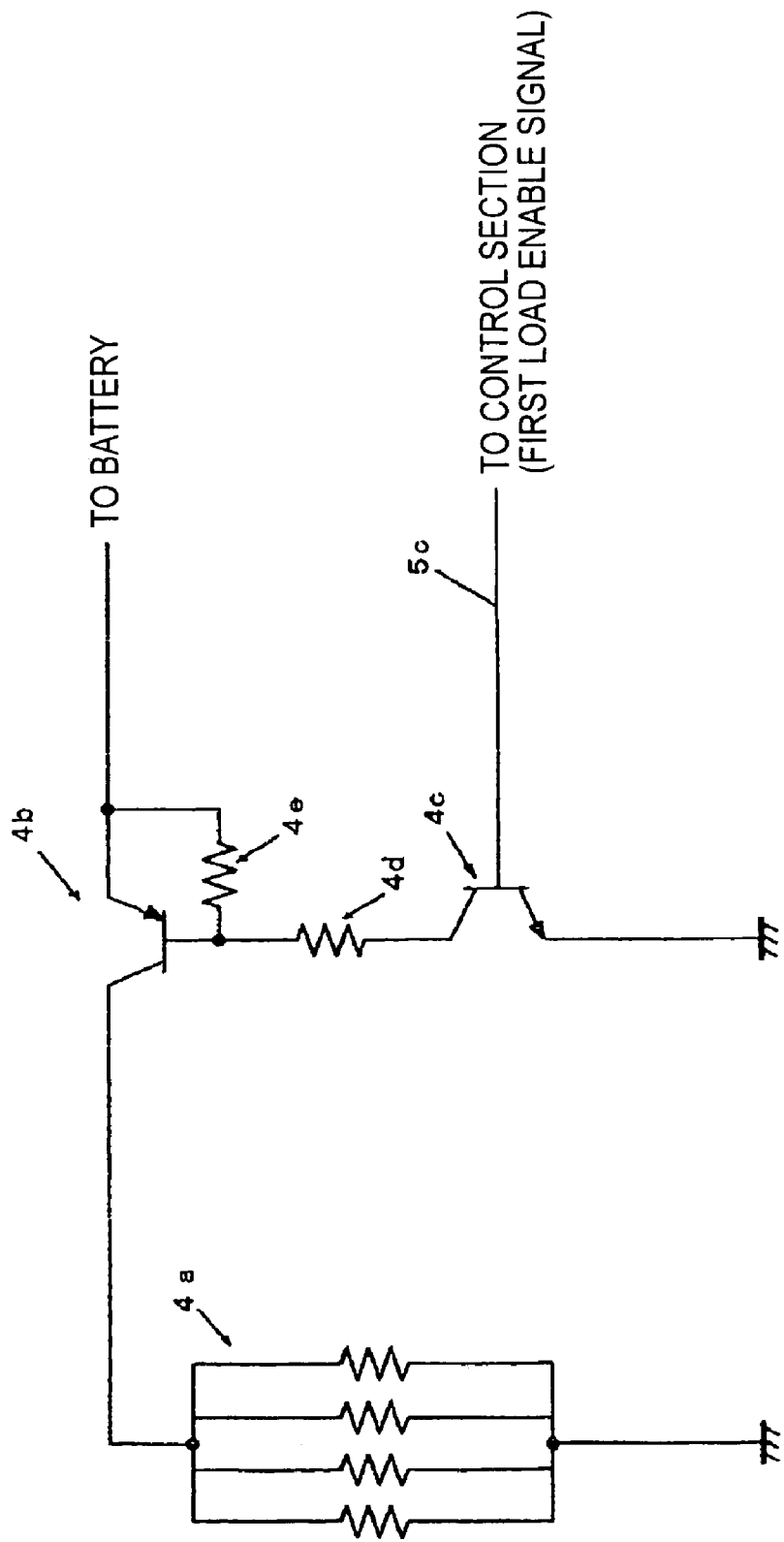
FIG. 2 is a view of an example of a load circuit used in the radio telephone apparatus according to the first embodiment of the present invention.

FIG. 2 is a view for describing an example of a load circuit used in the radio telephone apparatus according to the first embodiment of the present invention. FIG. 3 is a view for describing a transmission section, a receiving section, and a load circuit, which are arranged on a substrate of the radio telephone apparatus according to the first embodiment of the present invention.

A portable cellular phone 1 establishes digital communication with a base station by compressing voice data. This communication is effected by a time-division slot, wherein a transmission slot for transmitting a radio wave to the base station and a receiving slot for receiving the radio wave from the base station are alternately switched.

As shown in FIG. 1, the portable cellular phone 1 includes a transmission section 2 for transmitting a radio wave to a base station (not shown), a receiving section 3 for receiving the radio wave transmitted from the base station, a first load circuit 4 which is a dummy circuit for consuming an electric current, a control section 5 for controlling operations of these circuits, and a battery 6 which is to serve as a power source for these circuits.

The portable cellular phone 1 includes a display panel for displaying numeric keys used for entering a phone number and characters, and for displaying function keys, characters, and numerics; a speaker for outputting a voice; an antenna used for receiving and transmitting a radio wave; a voice coil which is magnetically coupled with a pickup coil of a hearing aid, and so forth. However, these elements are omitted from FIG. 1.

The transmission section 2 is a circuit which modulates input transmission data, subjects the thus-modulated signal to frequency conversion, amplifies the thus-frequency-modulated signal to thus generate a radio wave, and transmits the radio wave to the base station by way of an antenna. When transmitting a radio wave to the base station, the transmission section 2 consumes about 300 mA.

The receiving section 3 is a circuit which amplifies the radio wave input by way of the antenna and subjects the thus-input radio wave to frequency conversion to thus demodulate the radio wave. When receiving a radio wave transmitted from the base station, the receiving section 3 consumes about 100 mA.

The first load circuit 4 is a circuit for consuming a difference current between the electric current consumed by the transmission section 2 and the electric current consumed by the receiving section 3. The first load circuit 4 will be described in detail by reference to FIG. 2.

As shown in FIG. 2, the first load circuit 4 includes a load resistor 4a which consumes an electric current as a result of the electric current flowing through the load resistor 4a, and a transistor 4b whose collector is connected to the load resistor 4a and whose emitter is connected to the battery 6. This transistor 4b is a switching element for feeding an electric current from the battery 6 to the load resistor 4a.

The first load circuit 4 also has a transistor 4c which inputs a first load enable signal by way of the control section 5, to thus switch the transistor 4b between an enabled state and a disabled state. A resistor 4d for limiting a flowing electric current is interposed between the collector of the transistor 4c and the base of the transistor 4b. Likewise, a resistor 4e for limiting a flowing electric current is interposed between the resistor 4d and the battery 6.

The load resistor 4a includes four resistors connected in parallel with each other. If a resistor having normal rated power for sustaining the heat resulting from consumption of an electric current is used, a resistor having a comparatively large rated value must be selected. For this reason, adjustment is performed by connecting resistors of a comparatively large rated value in parallel with each other so as to meet consumption of a required electric current. In the present embodiment, four resistors, each having a resistance of 68 Ω and a power of 0.25 W, are connected in parallel to each other. If a single resistor has rated power for sustaining heat generation, a parallel connection will not be employed, and the load resistor 4a may be formed from a single resistor.

The control section 5 has the function of generating a transmission section enable signal for activating the transmission section 2, a receiving section enable signal for activating the receiving section 3, and a first load enable signal for activating the first load circuit 4.

This transmission section enable signal is reported by way of a transmission section enable line 5a which connects the control section 5 to the transmission section 2. Further, the receiving section enable signal is reported by way of a receiving section enable line 5b which connects the control section 5 to the receiving section 3. The first load enable signal is reported by way of a load circuit enable line 5c which connects the control section 5 to the first load circuit 4.

Arrangement of the substrate on which the transmission section 2, the receiving section 3, and the first load circuit 4 are mounted will now be described.

Figure 3:
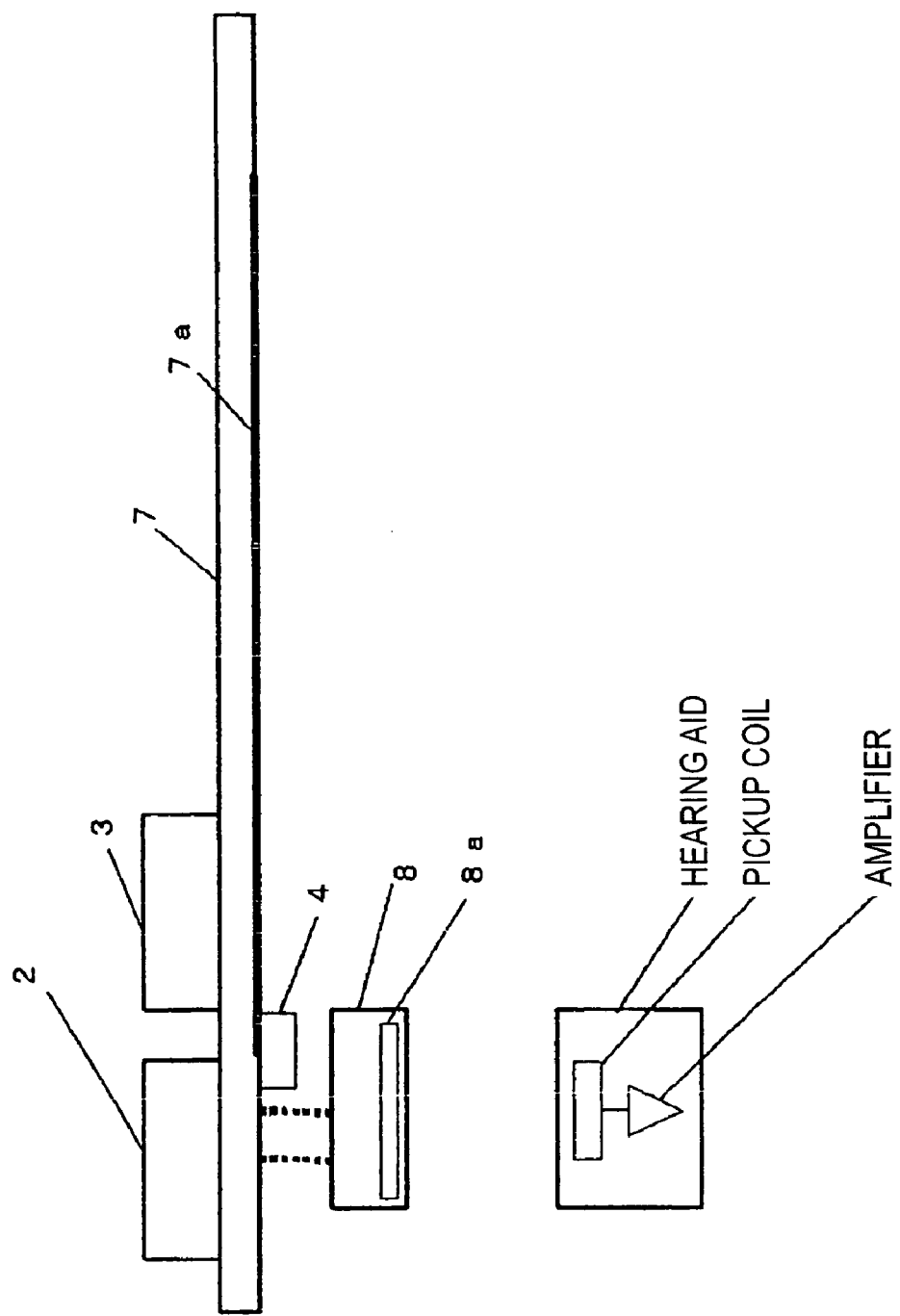
FIG. 3 is a view of a transmission section, a receiving section, and a load circuit, which are arranged on a substrate of the radio telephone apparatus according to the first embodiment of the present invention.

As shown in FIG. 3, circuit components of the portable cellular phone 1 are mounted on a substrate 7 on which wiring patterns are formed. The transmission section 2, the receiving section 3 and the first load circuit 4 are mounted on the substrate 7. The receiving section 3 and the first load circuit 4 consumes the same amount of electric current as that consumed by the transmission section 2. The transmission section 2, the receiving section 3, and the first load circuit 4 are connected to the battery 6 that is not shown in FIG. 3, and an electric current is fed by a power source pattern 7a formed on the substrate 7.

The first load circuit 4 is mounted on a surface of the substrate 7 opposite to a surface of the substrate 7 on which the transmission section 2 and the receiving section 3 are mounted. The receiving section 3 and the first load circuit 4 being disposed as close as possible with respect to the transmission section 2, so that lengths of the lines for connecting the respective circuits which extend from the power source pattern 7a can be diminished. A magnetic field, which is induced by timewise changes in consumed electric current, can be reduced by shortening the lengths of the lines from the power source pattern 7a.

In the portable cellular phone 1 of the present embodiment shown in FIG. 3, an unillustrated antenna is provided so as to protrude upward from a body of the portable cellular phone 1 in a state that the operator's ear is located near the portable cellular phone, and hence the circuit components are arranged at positions on the substrate 7 in proximity to the antenna. Accordingly, the transmission section 2 is arranged close to a speaker 8. Therefore, the receiving section 3 and the first load circuit 4 are arranged adjacent to the transmission section 2.

However, in order to diminish the magnetic field occurred from timewise changes in the consumed electric current, the only requirement is to arrange the receiving section 3 and the first load circuit 4 adjacent to the transmission section 2. Therefore, the transmission section 2 is not limited to the position shown in FIG. 3. The first load circuit 4 is mounted on the surface of the substrate 7 opposite the surface on which the transmission section 2 is mounted. However, if the first load circuit 4 is mounted on the same surface where the transmission section 2 is mounted, no problem arises, so long as the first load circuit 4 and the transmission section 2 are arranged side by side.

Figure 4:
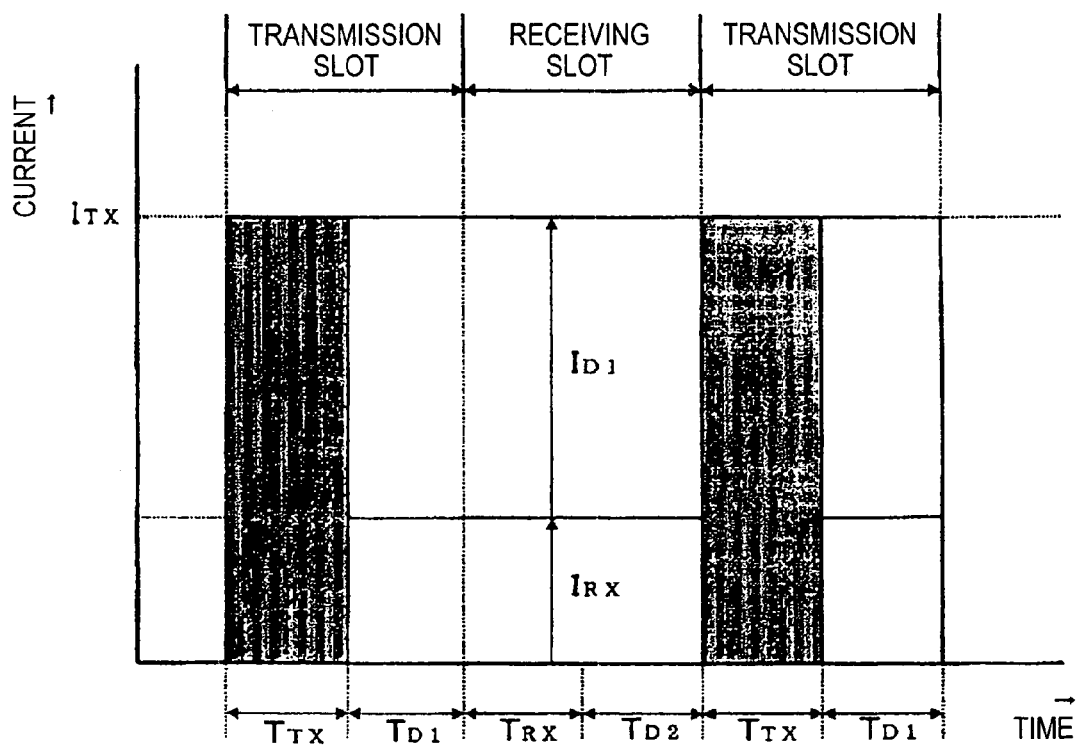
FIG. 4 is a timing chart for describing operation of a portable cellular phone of the first embodiment of the present invention.
Figure 5:
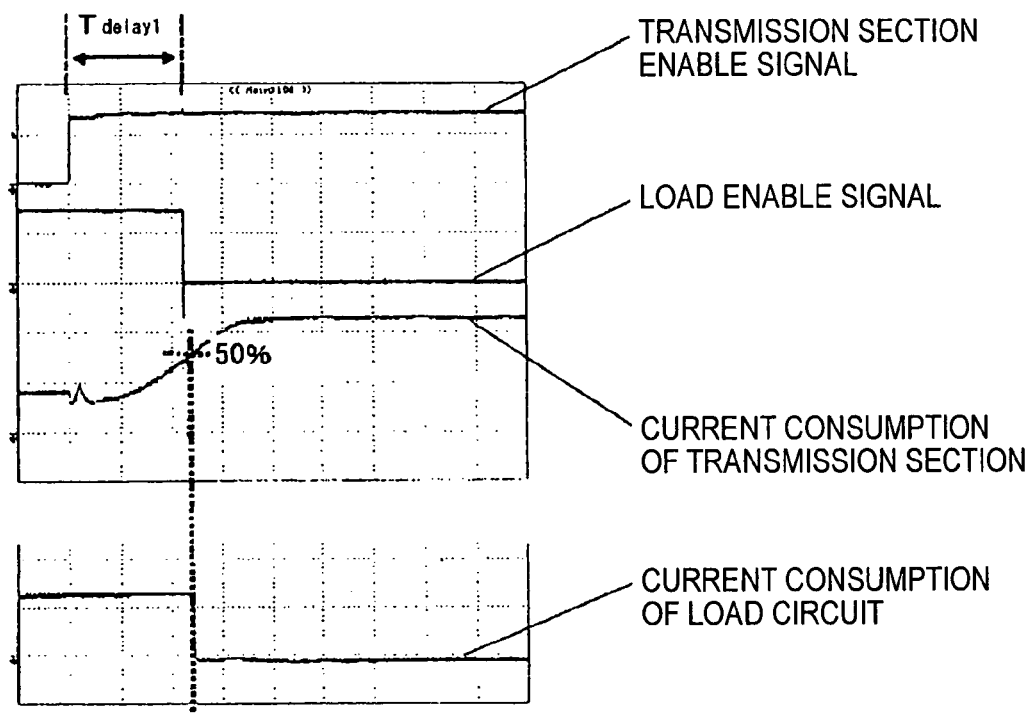
FIG. 5 is a waveform chart showing a voltage waveform of a transmission section enable signal, a voltage waveform of a first load enable signal, the waveform of an electric current consumed by the transmission section, and the waveform of an electric current consumed by the load circuit, all of which are acquired when the transmission section is activated.
Figure 6:
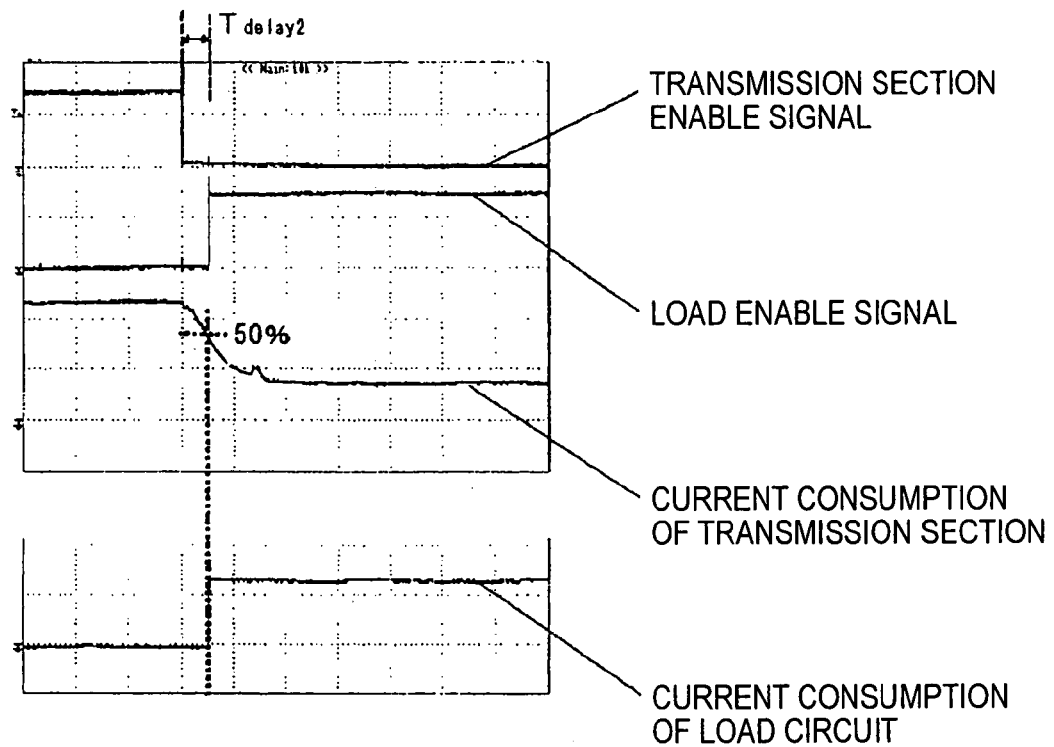
FIG. 6 is a waveform chart showing a voltage waveform of a transmission section enable signal, a voltage waveform of a first load enable signal, the waveform of an electric current consumed by the transmission section, and the waveform of an electric current consumed by the load circuit, all of which are acquired when the transmission section is deactivated.

Operation of the portable cellular phone of the present embodiment having the above-described configuration will be described by reference to FIGS. 1 through 6. FIG. 4 is a timing chart for describing operation of the portable cellular phone of the first embodiment of the present invention. FIG. 5 is a waveform chart showing a voltage waveform of a transmission section enable signal, a voltage waveform of a first load enable signal, the waveform of an electric current consumed by the transmission section, and the waveform of an electric current consumed by the load circuit, all of which are acquired when the transmission section is activated. FIG. 6 is a waveform chart showing a voltage waveform of a transmission section enable signal, a voltage waveform of a first load enable signal, the waveform of an electric current consumed by the transmission section, and the waveform of an electric current consumed by the load circuit, all of which are acquired when the transmission section is deactivated.

Timings of the transmission section enable signal, the receiving section enable signal, and the first load enable signal, all of which are generated by the control section 5, will first be described.

As shown in FIG. 4, transmission data are transmitted in the form of a radio wave from the transmission section 2 to the base station during a period TTX in which a radio wave of the transmission slot is transmitted. Hence, the control section 5 is required to activate the transmission section 2 in the period TTX. For this reason, the control section 5 enables the transmission section enable signal for activating the transmission section 2 during the transmission slot, thereby reporting the transmission section enable signal to the transmission section 2 through the transmission section enable line 5a. The control section 5 disables the receiving section enable signal and the first load enable signal when having enabled the transmission section enable signal.

As shown in FIG. 2, when the first load enable signal is disabled, the transistor 4c is in an OFF state. Specifically, since the electric current from the battery 6 does not flow through the base of the transistor 4c, the voltage between the base and the emitter of the transistor 4b remains constant, so that the transistor 4b is turned off. Accordingly, the battery 6 and the resistor 4e are separated from each other.

Turning again to FIG. 4, the transmission section 2 that has received the enabled transmission section enable signal transmits the transmission data as a radio wave by way of the antenna. The value of the electric current consumed at the transmission section 2 at that time becomes ITX.

After having activated the transmission section 2 for a predetermined period of time, the control section 5 disables the transmission section enable signal, and sends a report to the transmission section 2 by way of the transmission section enable line 5a. Further, the control section 5 enables the receiving section enable signal for activating the receiving section 3 and the first load enable signal for activating the first load circuit 4, and sends a report to the receiving section 3 and the first load circuit 4 by way of the receiving section enable line 5a and the first load circuit enable line 5c.

When the transmission section 2 receives the disabled transmission section enable signal, the transmission section 2 halts transmission of the radio wave. When the receiving section 3 receives the receiving section enable signal as being enabled, the receiving section 3 operates so as to receive a radio wave from the base station.

However, even when output from the receiving section 3 so as not to affect operation, the data received during a period TD1 which does not correspond to the receiving slot are disregarded.

As shown in FIG. 2, when the first load enable signal becomes enabled, the transistor 4c is turned on. Then, the electric current from the battery 6 flows through the base of the transistor 4c, and hence a voltage between the base and emitter of the transistor 4b assumes a value of about 0.7 V, whereby the transistor 4b is turned on. Consequently, the battery 6 and the resistor 4e are brought into connection with each other, and hence the electric current from the battery 6 flows into the load resistor 4a through the transistor 4b.

As mentioned above, when the transmission section 2 is not activated since the transmission section enable signal becomes disabled, the receiving section 3 and the first load circuit 4 are activated to consume the electric current. As shown in FIG. 4, the first load circuit 4 configured by a circuit which consumes a difference current between the electric current consumed by the transmission section 2 and the electric current consumed by the receiving section 3. The value I of the electric current consumed at this time corresponds to a sum of the electric current ID1 consumed by the first load circuit 4 and the electric current IRX consumed by the receiving section 2, and hence becomes equal to the electric current ITX. Specifically, the timewise changes in consumed electric current at the transition between the receiving slot and the transmission slot can be reduced, therefore the hearing-impaired person's difficulty of hearing, which is attributable to variations in the magnetic field, can be reduced.

Further, since the timewise changes in the consumed current can be suppressed without mounting a large component such a smoothing capacitor on the substrate. Consequently, it is provided that the radio telephone apparatus that allows the hearing-impaired person to easily hear a voice.

Furthermore, since the consumption section is configured by the receiving section and the first load circuit which consumes a difference current between the electric current consumed by the transmission section 2 and the electric current consumed by the receiving section 3 so that the consumption section consumes the same amount of electric current as that the transmission section 2 in amount, a circuit which consumes the electric current as same as the consumed electric current of the transmission section 2 can be easily configured as the consumption section. Also, since the consumed electric current of the first load circuit serving as a dummy circuit is adjusted so that sum of the consumed electric current of the first load circuit and the consumed electric current of the receiving section 3 is equal to the consumed electric current of the transmission section 2, the consumed electric current of the first load circuit can be reduced, thereby a heat generation can be suppressed.

Even when the period TRX of the receiving slot during which data are transmitted in the form of a radio wave from the base station has come, the control section 5 has successively enabled the receiving section enable signal for activating the receiving section 3 and the first load enable signal for activating the first load circuit 4. Accordingly, no timewise changes arise in the consumed electric current.

If the data output from the receiving section 3 that has received data during the period TRX of the receiving slot correspond to voice data, the speaker 8 is activated such that the data are output as a voice by control of the control section 5. Further, an electric current corresponding to the voice is caused to flow into the voice coil 8a. Control operation performed by the control section 5 during TD2 of the receiving slot that is a period in which no radio wave is transmitted from the base station is identical with that performed in TD1, and hence the control operation is omitted. The transmission slot and the receiving slot are repeated as mentioned above.

The timing of the transmission section enable signal generated by the control section 5 and the timing of the first load enable signal are now described in more detail by reference to FIG. 5.

As shown in FIG. 5, when the transmission section 2 is activated, the control section 5 enables the transmission section enable signal. In this case, the term "enable" means switching of a voltage of the signal from "Low" to "High." The control section 5 enables the transmission section enable signal, and disables the receiving section enable signal, which is not illustrated in FIG. 4 and the first load enable signal.

When the transmission section enable signal is enabled, a control IC (Integrated Circuit) which processes signals in the transmission section 2 requires a time from when operation is started until when processing can be performed. Accordingly, as shown in FIG. 5, the waveform of the electric current consumed by the transmission section 2 becomes such a waveform that a consumed electric current gradually increases. In the meantime, when the first load circuit 4 has disabled the first load enable signal, the consumed electric current assumes such a waveform that the electric current does not abruptly flow although a delay required to make switching between the transistors 4b and 4c, because only the load resistor 4a and the transistor 4b are arranged in the path along which an electric current flows.

When the control section 5 simultaneously switches the transmission section enable signal and the first load enable signal, a timewise valley appears in the sum of the electric current consumption of the transmission section 2 and the electric current consumption of the first load circuit 4 and the receiving section 3. This timewise valley signifies a timewise change in consumed currents, and hence a magnetic field develops from the transmission section 2. Accordingly, the control section 5 slightly delays (Tdlay1) the timing at which the load enable signal is disabled with reference to the timing at which the transmission section enable signal is made enable.

This timing is preferably made equal to the timing at which the electric current assumes a value of about 50% of the maximum value. As a result, the electric current consumed by the transmission section 2 is increased, whereas the electric current consumed by the first load circuit 4 and the receiving section 3 decreases. Hence, the sum of the electric current consumed by the transmission section 2, the electric current consumed by the first load circuit 4, and the electric current consumed by the receiving section 3 can be made close to a constant value. As a result, the timewise changes in the electric current consumed by the portable cellular phone 1 can be reduced.

The portable cellular phone 1 of the present embodiment has been made to consume an electric current through use of a resistor so that the first load circuit 4 can be configured readily. Hence, abrupt changes arise in the waveform of the consumed electric current. However, the control section 5 adjusts such that the timing at which the electric current consumed by the transmission section 2 assumes a value of 50% and the timing at which the electric current consumed by the first load circuit 4 assumes a value of 50% become equal to each other.

As shown in FIG. 6, when operation of the transmission section is stopped, the control section 5 disables the transmission section enable signal. The control section 5 disables the transmission section enable signal, and enables the receiving section enable signal, which is not shown in FIG. 6, and the first load enable signal.

In order to cause the transmission section 2 to operate, the timings at which the first load enable signal and the receiving section enable signal are disabled are delayed for a period of Tdelay2 with respect to the timing at which the transmission section enable signal is disabled, as in the case where the transmission section enable signal is enabled. As a result, the sum of the decreasing electric current consumption of the transmission section 2 and the increasing electric current consumption of the first load circuit 4 and the receiving section 3 can be made close to a constant value, thereby reducing a timewise change in the electric current consumed by the portable cellular phone 1.

As mentioned above, the first load circuit 4 is constituted of a resistor and a transistor, and hence the area on the substrate 7 where the first load circuit 4 is mounted can be reduced, thereby enabling pursue of size and weight reduction.

Second Embodiment

Figure 7:
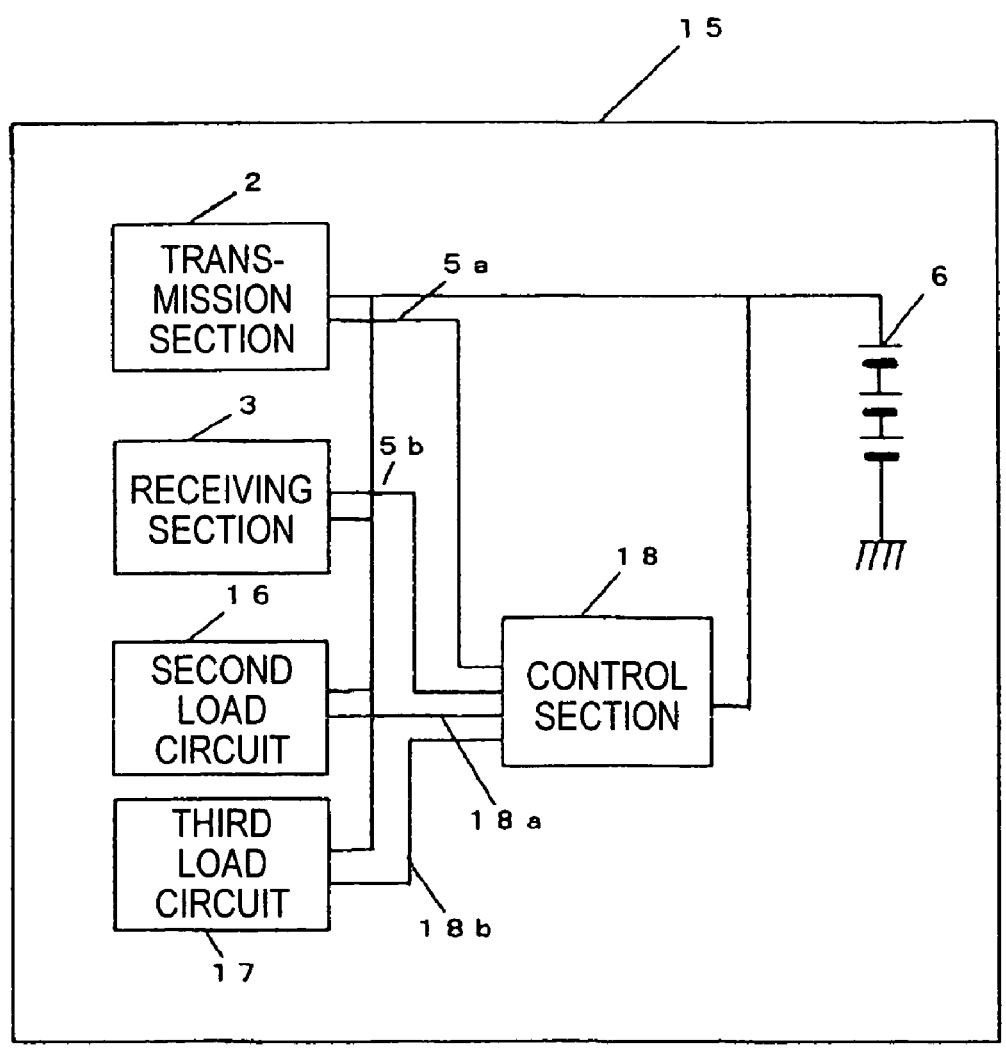
FIG. 7 is a view for describing the portable cellular phone, which is an example of the radio telephone apparatus of a second embodiment of the present invention.

The configuration of a portable cellular phone, which is an embodiment of a radio telephone apparatus according to a second embodiment of the present invention, will be described by reference to FIG. 7. FIG. 7 is a view for describing the portable cellular phone, which is an example of the radio telephone apparatus of the second embodiment of the present invention. In FIG. 7, the transmission section 2, the receiving section 3, and the battery 6, all of which are shown in FIG. 1, have the same configurations, and hence they are assigned the same reference numerals, and their explanations are omitted.

As shown in FIG. 7, a portable cellular phone 15 includes a second load circuit 16 and a third load circuit 17. The second load circuit 16 is a circuit which consumes the same amount of electric current as that consumed by the transmission section 2. The third load circuit 17 is a circuit which consumes a difference current between the electric current consumed by the transmission section 2 and the electric current consumed by the receiving section 3.

The second load circuit 16 is connected to the control section 18 by way of a second load circuit enable signal line 18a, and the third load circuit 17 is connected to the control section 18 by way of a third load circuit enable signal line 18b. The second load enable line is reported as being enabled from the control section 18 by way of the second load circuit enable signal line 18a, whereby the second load circuit 16 is operated. The third load enable line is reported as being enabled from the control section 18 by way of the second load circuit enable signal line 18, whereby the third load circuit 17 is operated. The control section 18 has the function of generating the second load enable signal and the third load enable signal.

Figure 8:
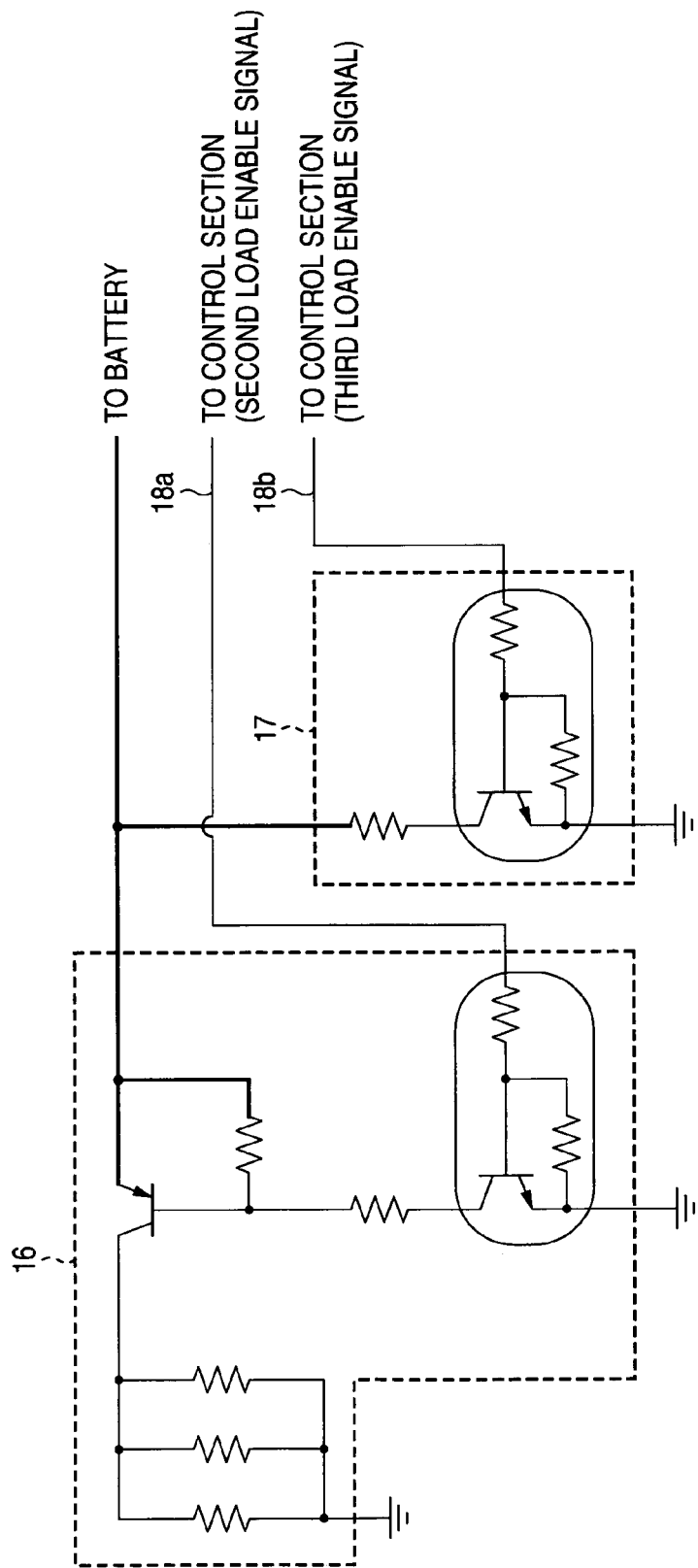
FIG. 8 is a view for describing an example of a load circuit used in the radio telephone apparatus according to the second embodiment of the present invention.

FIG. 8 shows the second load circuit 16 and the third load circuit 17. The second load circuit 16 responsive to the second load enable signal is analogous to the first load circuit 4. The first load circuit 4 can be applied to the present embodiment by changing the resistance value of the load resistor 4a of the circuit described in connection with the first embodiment by reference to FIG. 2.

The third load circuit 17 is smaller than the first load circuit 4 or the second load circuit 16 in the electric current consumption, and is implemented by switching the power from the battery; that is, an electric current, through use of a switching transistor.

Operation of the portable cellular phone, which is an example of the portable radio telephone apparatus of the second embodiment of the present invention having the above configuration, will be described by reference to FIG. 9. FIG.

9 is a timing chart for describing operation of the radio telephone apparatus according to the second embodiment of the present invention.

Figure 9:
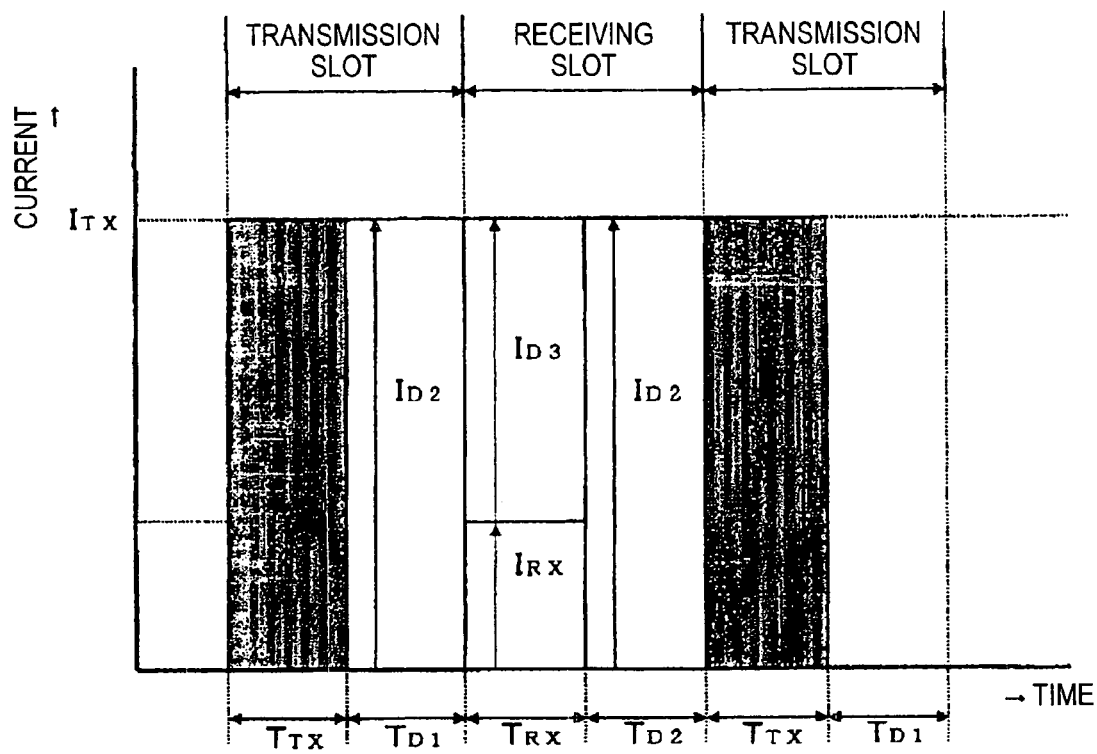
FIG. 9 is a timing chart for describing operation of a portable cellular phone of the second embodiment of the present invention.

As shown in FIG. 9, in order to transmit transmission data to the base station as a radio wave from the transmission section 2, the control section 18 activates the transmission section 2 during a period TTX of a transmission slot during which a radio wave is transmitted. The control section 18 enables the transmission section enable signal, which activates the transmission section 2 in the transmission slot, and sends a report by way of the transmission section enable line 5a. When the transmission section enable signal has been enabled, the control section 5 disables the receiving section enable signal, the second load enable signal, and the third load enable signal.

The transmission section 2 having received the enabled transmission section enable signal transmits the transmission data as a radio wave by way of the antenna. The value of electric current consumption achieved at this time is ITX.

The control section 18 activates the transmission section 2 for a predetermined period, then, disables the transmission section enable signal, and sends a report to the transmission section 2 by way of the transmission section enable line 5a. Further, the control section 18 enables the second load enable signal used for activating the second load circuit 16, and sends a report by way of the second load circuit enable line 18a.

As a result of the second load enable signal having been enabled, the second load circuit 16 is activated during TD1, which is a part of a period during which the transmission section enable signal is disabled, to thus consume an electric current. The second load circuit 16 is formed as a circuit which consumes the same amount of electric current as is consumed by the transmission section 2. The value I of electric current consumption achieved at this time turns into an electric current value ID2 consumed by the first load circuit 4, and hence becomes equal to ITX.

When the period TRX of the receiving slot, during which data are transmitted in the form of a radio wave from the base station, has come, the control section 5 enables the receiving section enable signal used for activating the receiving section 3 and the third load enable signal used for activating the third load circuit 17, and hence timewise changes in electric current consumption can be reduced.

If the data output from the receiving section 3 that has received the data during the period TRX of the receiving slot correspond to voice data, the speaker 8 is activated so as to output the data as a voice under control of the control section 18. Moreover, an electric current corresponding to the voice is fed to the voice coil 8a. Control of the control section 5 performed during TD2, which is a period during which a radio wave is not transmitted from the base station for the receiving slot, is analogous to that performed during TD1, and hence is omitted here for clarity. As mentioned above, the transmission slot and the receiving slot are repeated.

As mentioned above, the second load circuit 16 and the third load circuit 17, which correspond to consumption section, are activated during the period in which the transmission section 2 remains inoperative, so as to consume the same amount of electric current as is consumed by the transmission section 2. Thereby, timewise changes in electric current consumption can be reduced.

The consumption section which consumes the electric current identical with the consumed electric current of the transmission section is configured by the receiving section, the second load circuit and the third load circuit, and the control section adjusts the term in which the operations of these circuits are activated. Therefore, an electric current the same in amount as the consumed electric current of the transmission section can be consumed in the term of non-operation of the transmission section. Also, the second load circuit and the third load circuit may be configured by the resistance and the switching circuit. In this case, the amount of the electric currents flowing to the second and third load circuits does not change abruptly. As a result, the electric current can be easily controlled, rather than in a case that the load circuit includes the receiving section.

The embodiments of the present invention have been described thus far. However, the present invention is not limited to these embodiments. For instance, the first and second embodiments have described an example of the portable cellular phone. However, the present invention can be applied to a telephone, so long as the telephone has a transmission section and a receiving section. Accordingly, the present invention can be applied to a cordless telephone base unit as well as to a handset.

In order to consume the same amount of electric current as is consumed by the transmission section, consumption section is formed from the receiving section and the first load circuit in the first embodiment, and consumption section is formed from the receiving section, the second load circuit, and the third load circuit in the second embodiment. However, consumption section may be combined with a circuit which performs another function to be provided for the radio telephone apparatus such that the control section generates a signal used for enabling operation. As a result, adjustment can be performed so as to compensate for a timewise gap between changes in electric current consumption arising when the transmission section operates and changes in electric current consumption arising when the transmission section is stopped.

Third Embodiment

Figure 10:
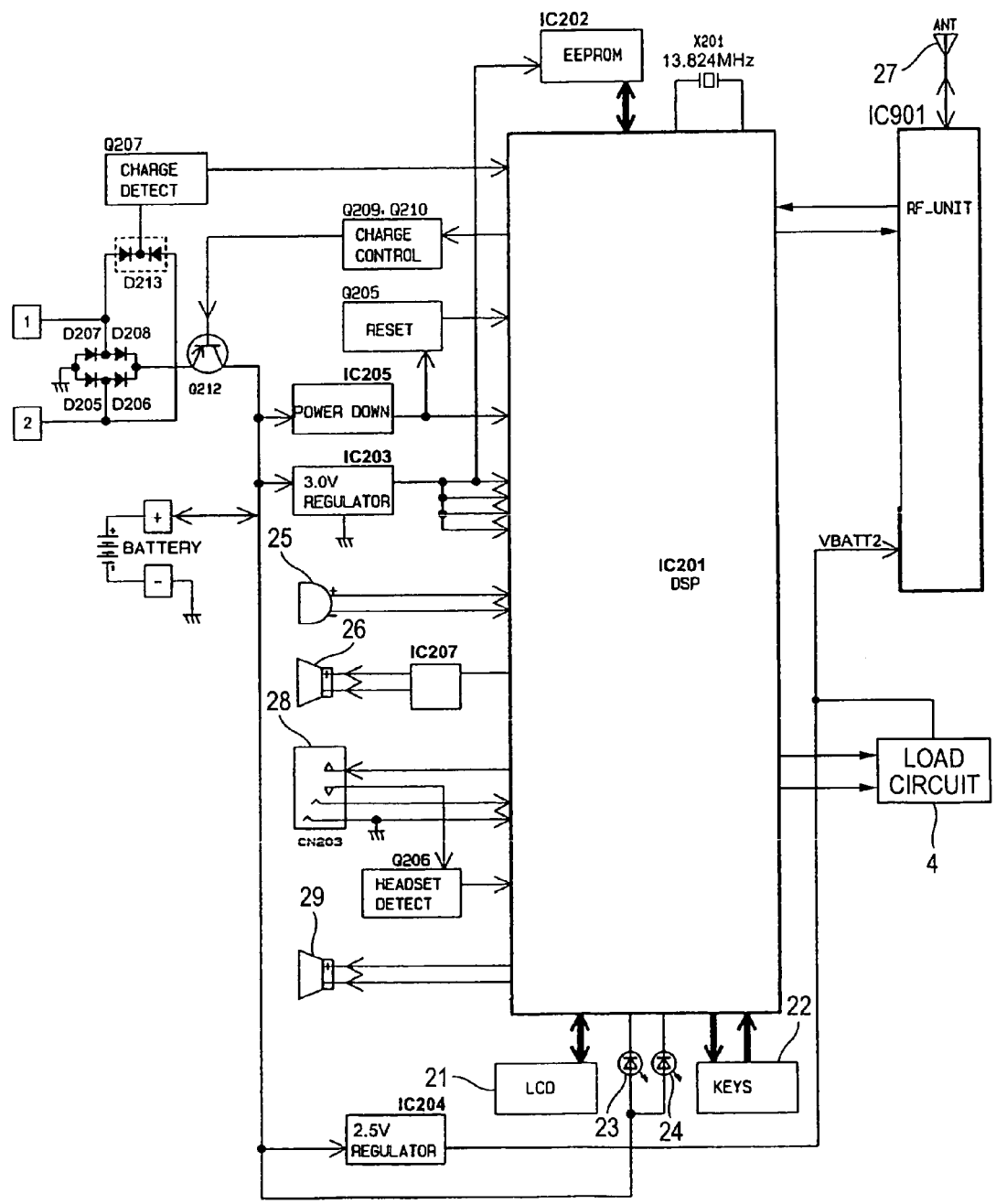
FIG. 10 is a view showing an example configuration of hardware of a radio telephone apparatus according to a third embodiment of the present invention.

FIG. 10 is a configuration example of hardware for implementing the portable cellular phone 1. The IC 201 is a microprocessor IC for controlling the portable cellular phone 1. Terminals 1 and 2 are for recharging the portable cellular phone 1. Electric currents input by way of the terminals 1 and 2 are subjected to bridge rectification in diodes D205 to D208 and employed as an electric current actually used for recharging operation or operating respective electronic components. Even when the terminals are reversely connected, the bridge rectification circuit can perform recharging operation and activate equipment with correct polarities.

At this time, the signal having passed by a diode D213 flows through a transistor Q207, and is used as a signal for determining whether or not the microprocessor IC 202 is performing recharging operation. The microprocessor IC 201 controls a transistor Q212 by the signal having passed through transistors Q209 and Q210, both of which are used for recharging control operation, thereby determining whether or not a radio section IC 901 or the battery is recharged by the electric current having been subjected to bridge rectification in the transistors Q205 to Q208.

The power having passed through the transistor Q212 becomes a signal for a terminal which detects occurrence of power-down of the microprocessor IC 202 by way of a power-down IC 205. Further, the power becomes a signal used for controlling a reset terminal of the microprocessor IC 201 by way of the transistor Q205 for reset control operation.

The power having passed through the transistor Q212 is transformed into a constant voltage of 3.0 V by an IC 203 which is a 3.0 V constant-voltage IC. The constant voltage is fed to the microprocessor IC 201 and an EEPROM IC 202 where an identification number of the portable cellular phone is stored.

The power having passed through the transistor Q212 is transformed into a low voltage of 2.5 V by an IC 204 which is a 2.5 V constant-voltage IC, and the constant voltage is supplied to the radio section IC 901 and the load circuit 4. The load circuit 4 is supplied with power from the 2.5 V constant-voltage IC 204 and controlled by the control signal from the microprocessor IC 201.

The power having passed through the transistor Q212 is used as power for an LED 23 for illuminating an LCD panel 21, as well as for a key light LED 24 for illuminating a key 22. The LED is connected to the microprocessor IC 201, thereby controlling illumination.

The microprocessor IC 202 is connected to a microphone for conversation purpose, the speaker, a headset, a monitoring speaker, the LCD panel 21 for displaying purpose, and the operation key 22. The power for the speaker is amplified by an audio-band amplifier IC 207. A jack capable of detecting connection of a headset is provided as a headset jack 28. A headset detection signal is input to the microprocessor IC 202 by means of the transistor Q206.

A transmission control signal and a receipt control signal are exchanged between the microprocessor IC 202 and the radio section IC 901. The radio section IC exchanges a radio signal by way of the antenna 27.

The microprocessor IC 202 can be embodied by use of a DLH 36117 manufactured by Japan DSP group Inc. The radio section IC can be embodied by use of a DH24RF17B manufactured by Japan DSP group Inc. The EEPROM IC 202 can be embodied by use of AT24C64AN manufactured by ATMEL Corporation.

The transistors, the diodes, the constant-voltage ICs, the power-down IC, and the audio-band amplifier other than the above-described ICs can be embodied by use of general-purpose ICs.

Figure 11:
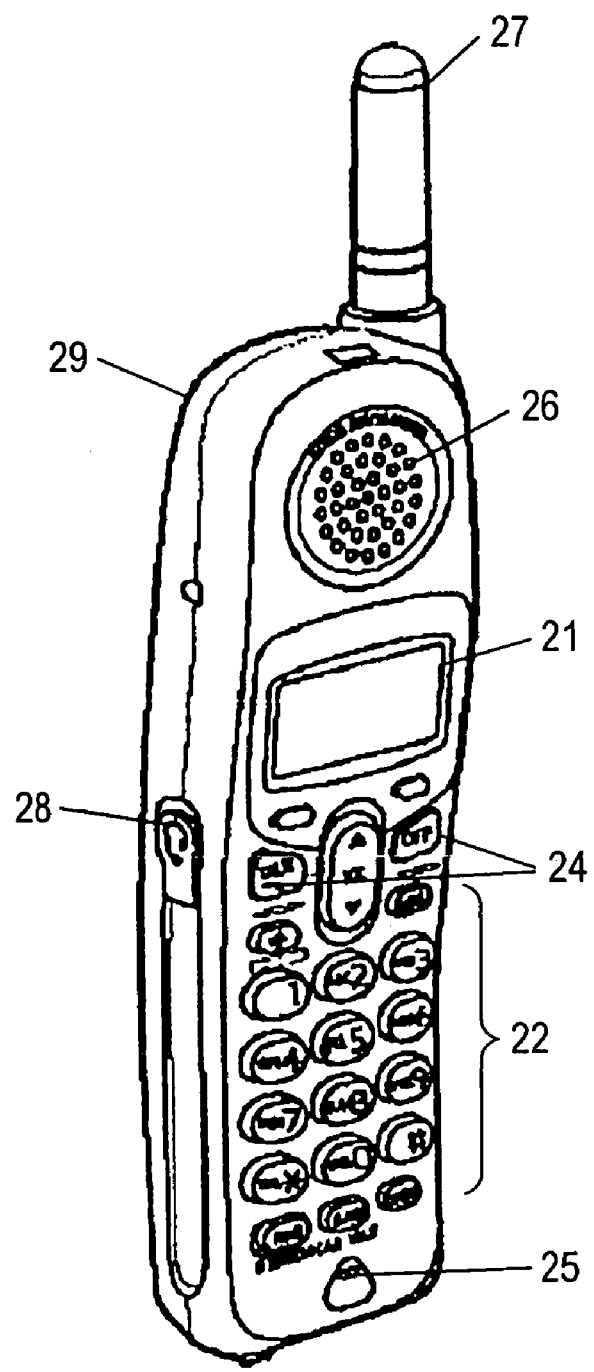
FIG. 11 is a view showing an example appearance of the radio telephone apparatus according to the third embodiment of the present invention.

FIG. 11 is a view showing an example appearance of the portable cellular phone 1. The user performs conversation through use of the microphone 25 and the speaker 26. The monitoring speaker 29 is provided on the back of the portable cellular phone 1. The headset jack 28 used for connection with a headset is provided on the side of the portable cellular phone.

The LCD 21 and the key 22 are provided on the front of the portable cellular phone, and the user performs call-originating operation and call-receiving operation. The key light 24 is provided for keys used for call operation, so that the status of the key is easily conceivable by display. The LCD 21 is illuminated by the LED 23 for use with an LCD.

By means of such a configuration, there can be realized a portable cellular phone which requires a smaller number of components, provides superior operability, and makes it easy for a hearing-impaired person to hear a voice.

The present invention can make it possible for a hearing-impaired person, who uses a heating aid equipped with a pickup coil, to hear a voice while miniaturization and weight reduction are pursued. Therefore, the present invention is suitable for use with a radio telephone apparatus which performs communication of a voice or data through radio transceiving operation and which is equipped with a voice coil used for magnetically coupling with a pickup coil provided in a hearing aid.

Although the present invention has been shown and described with reference to specific preferred embodiments, various changes and modifications will be apparent to those skilled in the art from the teachings fherein. Such changes and modifications as are obvious are deemed to come within the spirit, scope and contemplation of the invention as defined in the appended claims.

The present application is based on Japan Patent Application No. 2004-225366 filed on Aug. 2, 2004, the contents of which are incorporated herein for reference

What is claimed is:

1. A radio telephone apparatus, comprising:
a transmission section that transmits a radio wave;
a consumption section that consumes electric current; and
a control section that activates the consumption section to consume the electric current during a period when the transmission section is not activated and that deactivates the consumption section during a period when the transmission section is activated,
wherein the control section generates a transmission section enable signal for controlling an activation and a halt of the transmission section and a consumption section enable signal for controlling an activation and a halt of the consumption section, and
wherein the control section delays a timing of transmitting the consumption section enable signal for halting the consumption section with respect to a timing of transmitting the transmission section enable signal for activating the transmission section when the control section activates the transmission section so that a change of a sum of amounts of electric currents consumed by the transmission section and the consumption section is reduced during a transition from a halting state of the transmission section to an activating state of the transmission section.

2. The radio telephone apparatus as set forth in claim 1, wherein the control section delays a timing of transmitting the consumption section enable signal for activating the consumption section with respect to a timing of transmitting the transmission section enable signal for halting the transmission section when the control section halts the transmission section so that a change of a sum of amounts of electric currents consumed by the transmission section and the consumption section is reduced during a transition from an activate state of the transmission section to a halting state of the transmission section.

3. The radio telephone apparatus as set forth in claim 1, wherein the consumption section includes:
a receiving section for receiving a radio wave; and
a first load circuit for consuming an amount of a difference electric current between the amount of the electric current consumed by the transmission section and the amount of the electric current consumed by the receiving section; and
wherein the control section activates the receiving section and the first load circuit during the period when the transmission section is not activated.

4. The radio telephone apparatus as set forth in claim 3, wherein the control section generates a transmission section enable signal for controlling an activation and a halt of the transmission section, and a consumption section enable signal for controlling an activation and a halt of the consumption section; and
wherein the consumption section enable signal includes a receiving section enable signal for controlling an activation and a halt of the receiving section and a first load enable signal for controlling an activation and a halt of the first load circuit.

5. The radio telephone apparatus as set forth in claim 1, wherein the consumption section includes:
a receiving section for receiving a radio wave;
a second load circuit for consuming an amount of an electric current equal to that consumed by the transmission section; and a third load circuit for consuming an amount of a difference electric current between the amount of the electric current consumed by the transmission section and the amount of the electric current consumed by the receiving section; and wherein the control section activates the second load circuit or both of the receiving section and the third load circuit to consume the amount of the electric current during the period when the transmission section is not activated.

6. A method for controlling an amount of electric current consumed by a radio telephone apparatus that includes a transmission section and a consumption section the method comprising:

activating the transmission section for transmitting a radio wave;

activating the consumption section to consume electric current during a period when the transmission section is not activated;

deactivating the consumption section during a period when the transmission section is activated;

generating a transmission section enable signal for controlling an activation and a halt of the transmission section;

generating a consumption section enable signal for controlling an activation and a halt of the consumption section; and delaying a timing of transmitting the consumption section enable signal for halting the consumption section with respect to a timing of transmitting the transmission section enable signal for activating the transmission section when die control section activates the transmission section so that a change of a sum of amounts of electric currents consumed by the transmission section and the consumption section is reduced during a transition from a halting state of the transmission section to an activating state of the transmission section.

7. The method as set forth in claim 6, further comprising:

delaying a timing of transmitting the consumption section enable signal for activating the consumption section with respect to a timing of transmitting the transmission section enable signal for halting the transmission section when the control section halts the transmission section so that a change of a sum of amounts of electric currents consumed by the transmission section and the consumption section is reduced during a transition from an activate state of the transmission section to a halting state of the transmission section.

8. A radio telephone apparatus, comprising:

a transmission section configured to transmit a radio wave;

a consumption section configured to consume an amount of an electric current substantially equal to that consumed by the transmission section; and a control section configured to generate a transmission section enable signal for controlling an activation and a halting of the transmission section and a consumption section enable signal for controlling an activation and a halting of the consumption section, wherein the control section transmits the consumption section enable signal for halting the consumption section after transmitting the transmission section enable signal for activating the transmission section so that a change of a sum of amounts of electric current consumed by the transmission section and the consumption section is reduced from a halting state of the transmission section to an activating state of the transmission section.

9. The radio telephone apparatus set forth in claim 8, wherein the consumption section able signal includes a receiving section able signal for controlling an activation and a halt of the receiving section and a first load enable signal for controlling an activation and a halt of the first load circuit.

* * * * *